US008411115B1

(12) United States Patent  
Musselman et al.

(10) Patent No.: US 8,411,115 B1  
(45) Date of Patent: Apr. 2, 2013

(54) SCALING RASTER OBJECTS IN A GRAPHICAL DEVELOPMENT ENVIROMENT USING NINE-SLICE SCALING

(75) Inventors: Alan Musselman, San Francisco, CA (US); Vishakha Vaidya, Pune (IN)

(73) Assignee: Adobe Systems Incorporated, San Jose, CA (US)

(*) Notice: Subject to any disclaimer, the term of this patent is extended or adjusted under 35 U.S.C. 154(b) by 909 days.

(21) Appl. No.: 11/551,962

(22) Filed: Oct. 23, 2006

(51) Int. Cl.
*G09G 5/00* (2006.01)

(52) U.S. Cl. ........ 345/660; 345/661; 345/667; 345/619; 345/620

(58) Field of Classification Search .......... 345/660–667, 345/619–620
See application file for complete search history.

(56) References Cited

U.S. PATENT DOCUMENTS

| | | | | |
|---|---|---|---|---|
| 6,360,029 B1 * | 3/2002 | Moller | ........................ | 382/298 |
| 7,453,474 B2 * | 11/2008 | Faraday et al. | ............... | 345/660 |
| 2004/0263537 A1 * | 12/2004 | Faraday et al. | ............... | 345/660 |

OTHER PUBLICATIONS

Josh Cavalier, "What's New in Flash 8", by Lodestone Digital, LLC, Oct. 16, 2005.*

* cited by examiner

*Primary Examiner* — Jin-Cheng Wang  
(74) *Attorney, Agent, or Firm* — Kilpatrick Townsend & Stockton LLP

(57) ABSTRACT

Scaling of raster or bitmapped objects is described by converting such raster or bitmapped objects into symbol objects in a graphics development environment (GDE). A grid of lines is superimposed over the symbol visually dividing it into multiple segments. The position and shape of each segment will determine how the symbol is scaled during operation. The various segments may either be locked or editable. When edit input is received to change a size of the symbol, the locked portions of the symbol object are preserved while the editable regions are scaled to accommodate the edit instruction.

18 Claims, 7 Drawing Sheets

SCALING RASTER OBJECTS IN A GRAPHICAL DEVELOPMENT ENVIROMENT USING NINE-SLICE SCALING

TECHNICAL FIELD

The present invention relates, in general, to graphics development environments, and, more specifically, to scaling raster objects.

BACKGROUND

The growth and popularity of computer applications and the Internet is due, in large part, to the vast improvements in the user experience of computers in general. Advances in graphics capabilities, processing speed, and transmission bandwidth have allowed the creation of applications and websites that provide the user rich graphical, interactive, and useful experiences. Graphical development environments (GDEs), such as Adobe Systems Incorporated's FIREWORKS®, PHOTOSHOP®, ILLUSTRATOR®, FREEHAND®, FLASH®, and the like, provide an environment for application and graphics developers to create the graphics for most of the complex graphically-driven applications.

In the development of a graphical application, the author or developer typically uses graphical tools to draw objects that may be later used as repeatable symbols, components, and the like. Generated graphics may comprise vector graphics, which use geometrical primitives such as points, lines, curves, and polygons, that are all based upon mathematical equations, to represent images in computer graphics. Vector graphics are often used because they can typically be moved, scaled, rotated, filled, and the like without degrading the quality of a drawing. Many vector graphics are represented by quadratic Bézier curves, which generally use three control points to define a curve: two end points and a third control point. Other generated graphics may comprise raster objects. A raster object is a digital image or bitmap represented by a data file or structure defining a grid of pixels or points of color on a computer monitor, paper, or other display device. The color of each pixel is typically individually defined. For example, images in the RGB color space often consist of colored pixels defined by three bytes—one byte each for red, green and blue.

When used in an Internet application, the graphic, whether a vector graphic or a raster object, may change sizes to accommodate the screen size of various displays. Therefore, the developer typically designs the graphic to scale as naturally as possible. There are many different methods for allowing for such graphical objects to change sizes and shapes. One such method that has been used in web design is dividing the graphical object into nine sections by slicing it with a grid comprising two sets of perpendicularly intersecting parallel lines. Specific ones of the resulting nine sections of the object are then scaled and/or transformed according to the section of the grid in which they are located. The corner sections of the grid are typically not scaled. The remaining sections are scaled in some manner to achieve the desired transformation of the overall object. Once these remaining sections are scaled the corner sections may be translated as necessary to end up adjacent to the remaining sections of the object. This transformation may include some scaling; however, scaling is rarely performed on the corners. This approach to creating size/shape-variable graphics is generally referred to as "nine slicing," "nine scaling," "scale nine," or "slice nine." There is a difference when nine scaling a vector object as opposed to a raster object.

Raster graphics are often used in mock-ups or prototypes of different web interfaces for applications and web pages. Therefore, designers often work with such raster objects in the design process. In order to implement nine slice scaling when creating raster graphics, the developer graphically slices the graphic object into the number of smaller objects that facilitate the best scaling. The various segments may be scaled or preserved as necessary to conform to the desired shape, and are then place adjacent to one another to appear as a single graphic again. While this process may provide the desired scaling, it typically takes a great deal of time and effort for each object being scaled and/or transformed. Conventional graphics tools do not provide organized solutions to this problem. Furthermore, the nine slice grid lines need not be symmetrical about any particular axis of the object, which can make any attempt to automate the process highly complex to implement.

Generally, widespread scaling of raster objects is typically undesirable because the scaled graphic generally results in a less-pleasing graphical effect. This is because the magnification of the edges and corners of the object typically become noticeably altered. For example, an object with rounded corners that is magnified in this fashion can result in a "jagged" appearance. Therefore, simply scaling raster objects would actually diminish the user experience making it an undesirable process.

BRIEF SUMMARY

Various representative embodiments of the present invention are directed to systems, methods, and computer program products for specifying, in a GDE, a manner of scaling raster objects. Any raster or bitmapped objects created or imported by a developer are first converted into symbol objects in the GDE. When the feature is activated, a grid of lines is superimposed over the symbol object visually dividing it into two or more segments. The grid does not actually divide the symbol object into a number of smaller objects, but maintains the single object while creating visual divisions that have an association with the underlying area in the symbol object. The developer may manipulate the position of the grid lines in order to control how the symbol object will be scaled when placed into a design page. Once in the design page, when input is received to change a size of the symbol object, the locked portions of the symbol object, which are usually the corner regions of the grid but may be any region that the developer selects to be locked or uneditable, are preserved and maintained in size and shape. Any editable portions or regions of the symbol object, which are the regions not locked, are scaled accordingly to fit the edits entered by the user. Moreover, some of the various embodiments provide an option available to a developer for designating certain regions of the symbol object to be repeating regions. Instead of purely scaling a repeating region when edit instructions are received, the ODE analyzes the repeating region for any pattern that is present, and uses that pattern to increase or decrease the size and shape of the repeating region. In this manner, the original shape and size of the pattern is maintained while the overall size of the repeating region is changed to accommodate the edit instructions.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION

Figure 1A:
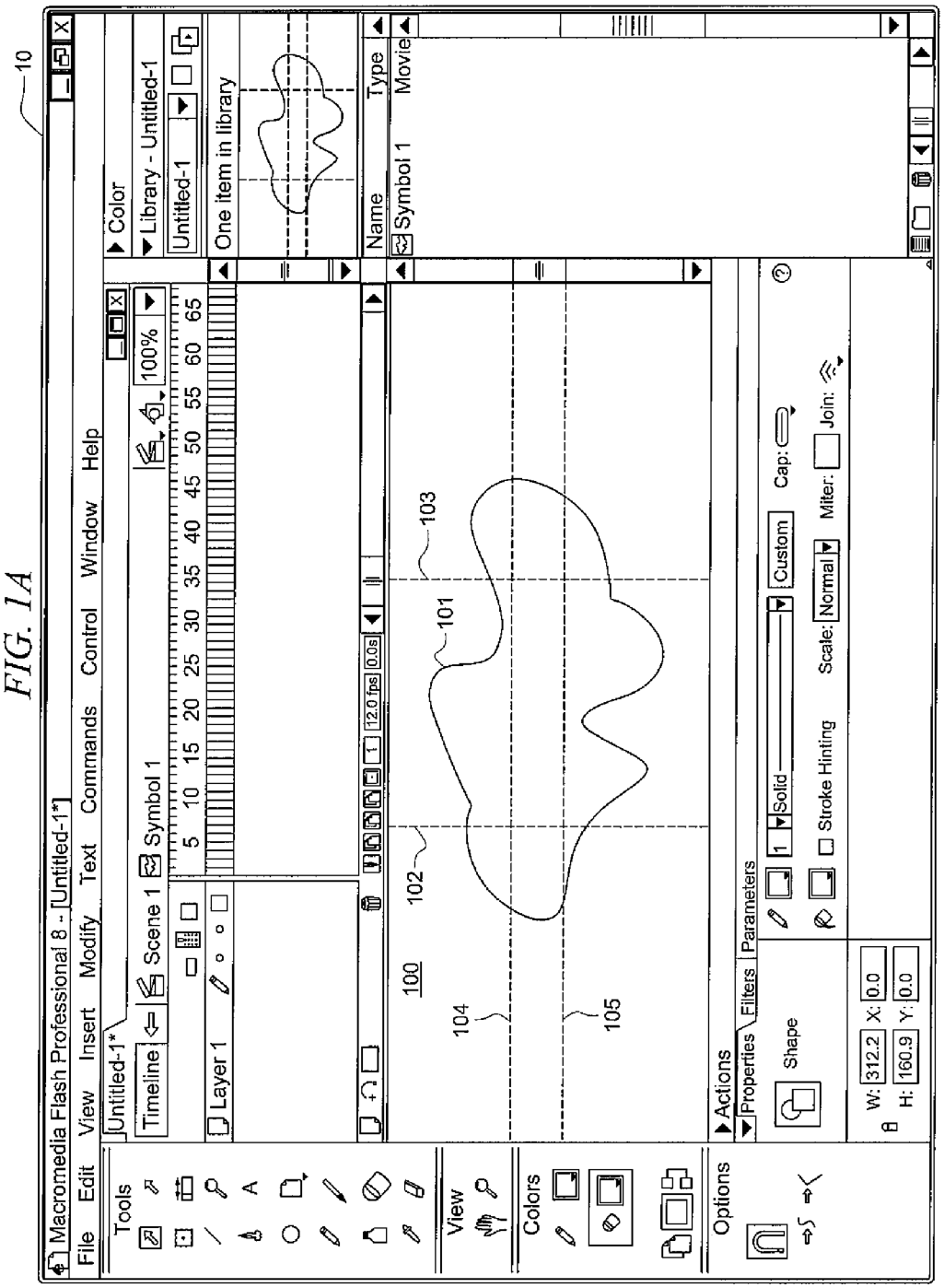
FIG. 1A is a screenshot illustrating a GDE configured according to one embodiment of the present invention.

FIG. 1A is a screenshot illustrating GDE 10 configured according to one embodiment of the present invention. In operation of GDE 10, a developer creates raster graphic 101 in design canvas 100. The designer selects to enable nine slice scaling. When selected, guide lines 102-105 are laid over raster graphic 101, visibly dividing raster graphic 101 into nine sections. The designer maintains full control over how raster graphic 101 is visibly divided by graphically manipulating any one of guide lines 102-105. GDE 10 allows the designer to move guide lines 102-103 horizontally and/or guide lines 104-105 vertically. The designer may then move any of guide lines 102-105 in order to affect how raster graphic 101 may be scaled or otherwise transformed.

Figure 1B:
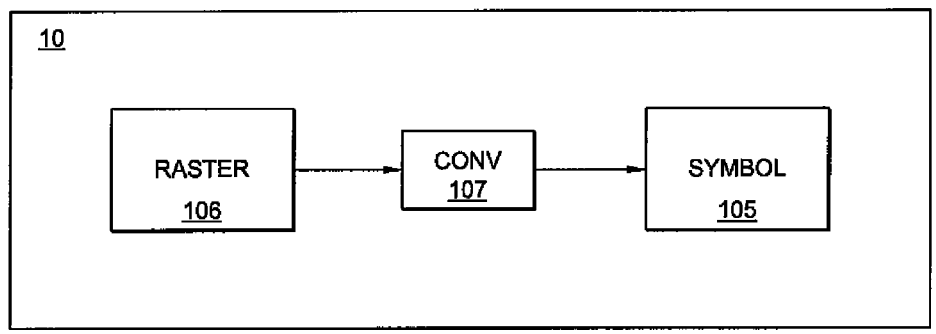
FIG. 1B is a block diagram illustrating a GDE configured according to one embodiment of the present invention.

FIG. 1B is a block diagram illustrating GDE 10 configured according to one embodiment of the present invention. In order to execute the 9-scale feature of GDE 10, the developer first converts the bitmapped or raster object he or she has created or imported into a symbol object. For example, after creating or importing raster object 106, the developer selects a command within GDE 10 that processes raster object 106 through converter 107 to create symbol object 108. Once symbol object 108 is prepared, the developer may activate the 9-scale feature of GDE 10.

A symbol object is a specialized container object used in various GDE, such as FIREWORKS®, ILLUSTRATOR®, FLASH®, and the like, to maintain a master version of some raster or vector graphic. Much like a library, the symbol object can then be used to create multiple instances of the symbol object in a design canvas. The symbol object is connected or linked to each instance, such that any changes that are made to the symbol object will be propagated to each individual instance. In some uses, there may be different transformations applied to each instance or different properties to each instance that results in each instance having an appearance very different from that of the underlying symbol object. However, the symbol object forms the base structure for each instance, and will still change in base structure if the symbol object is modified. Depending on the underlying object that the developer desires to convert into a symbol object, a symbol object may contain one or more objects that can be either a raster object, a vector object, or combinations of both objects. For example, if a single raster graphic is to be converted into a symbol object, the symbol object will contain just that single raster object. Furthermore, if a graphic object made up of multiple raster and vector graphics is to be converted into a symbol, the symbol object will contain a group of raster objects and vector objects.

Figure 2A:
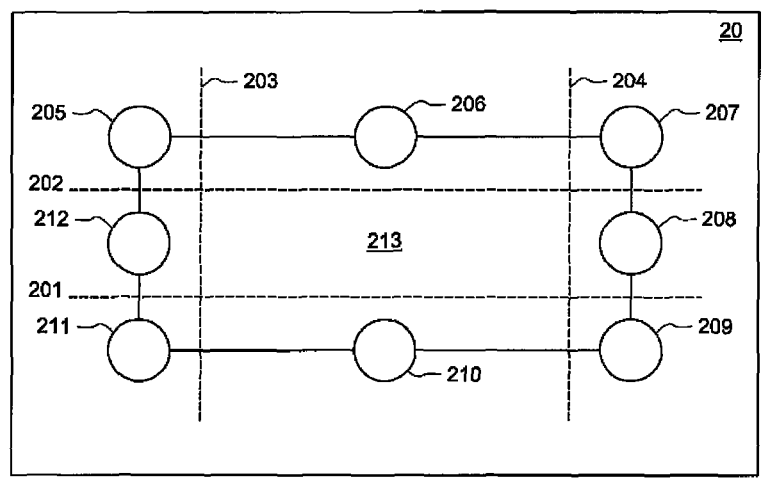
FIG. 2A is a screenshot illustrating a GDE configured according to one embodiment of the present invention.

FIG. 2A is a screenshot illustrating GDE 20 configured according to one embodiment of the present invention. A developer creates a raster graphic in GDE 20 and converts it into symbol object 200. Symbol object 200 maintains the graphical representation of the underlying raster graphic. GDE 20 allows the developer to edit symbol object 200, which will affect each instance of itself that is eventually placed within a design page. When the developer activates the 9-scaling feature of GDE 20, grid lines 201-204 are superimposed onto symbol object 200 visually dividing it into nine regions. Grid lines 201-204 do not physically divide symbol object 200 into multiple, separate and independent sub-objects, but merely provide a visual yet associated division of the single, symbol object 200 into discrete regions of the continuous object. The association of the visual division to the underlying symbol allows for each of the visual regions to be separately edited directly in symbol object 200. According to the standard 9-scale process, the corners, containing graphic articles 205, 207, 209, and 211, are locked or preserved in size and shape, while the top and bottom regions, containing graphic articles 206 and 210, are editable or scalable in the x-direction (the x-direction in FIG. 2A being side-to-side); and the side regions, containing graphic articles 208 and 212, are editable or scalable in the y-direction (the y-direction in FIG. 2A being top-to-bottom). The middle region, region 213, is editable or scalable in both the x- and y-directions.

Figure 2B:
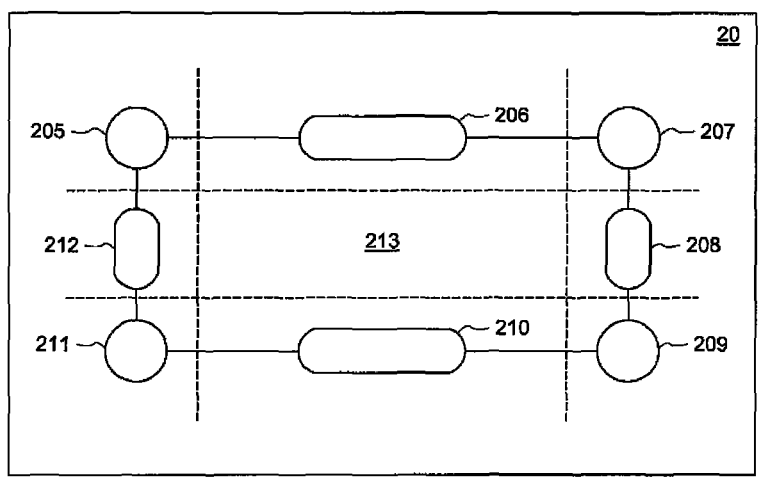
FIG. 2B is a screenshot illustrating a GDE configured according to one embodiment of the present invention.

FIG. 2B is a screenshot illustrating GDE 20 configured according to one embodiment of the present invention. When the 9-scale feature is activated and the developer has set the grid lines as he or she desires, the scalable symbol may be placed in the design canvas as desired. As editing signals are received from the developer in the design canvas that modify the size or shape of symbol object 200, those edits will be reflected in symbol object 200 according to the 9-scale process. As can be seen in FIG. 2B, the corners, which contain graphic articles 205, 207, 209, and 211, have been preserved in size and shape. There has been no distortion in graphic articles 205, 207, 209, and 211. In contrast, top and bottom regions, including graphic articles 206 and 210, and the side regions, including graphic articles 208 and 212 have been scaled and stretched. Because symbol object 200 represents a raster graphic, graphic articles 206, 208, 210, and 212 are seen as stretched and distorted from their respective original shapes and sizes.

In order to implement the elasticity of the editable regions, a group of pixels are captured and new pixels are added to the editable region to stretch or scale the editable region to fit the editing that the developer has done. The adding of the pixels within the editable regions is what distorts the appearance of the original graphic shape in the illustrated example. The new pixels are added by interpolating from the existing neighboring pixels. This addition of pixels in the interpolated regions is what gives rise to the jagged appearance typically found in scaled raster objects.

Figure 2C:
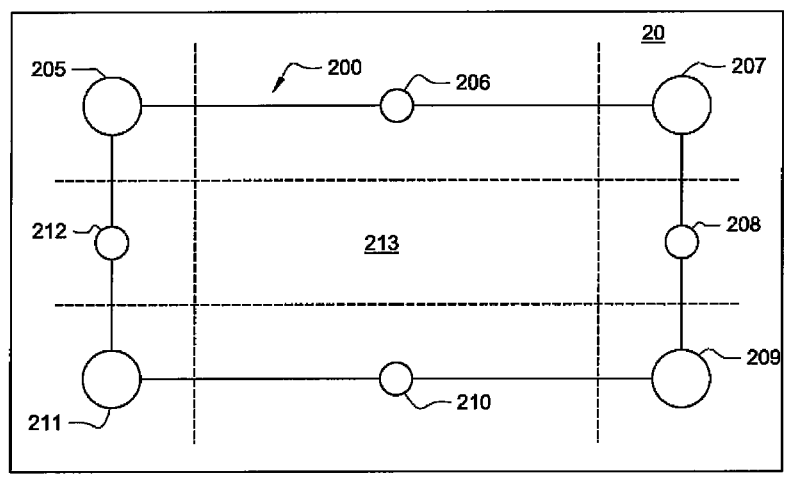
FIG. 2C is a screenshot illustrating a GDE configured according to one embodiment of the present invention.

FIG. 2C is a screenshot illustrating GDE 20 configured according to one embodiment of the present invention. Instead of stretching the size and shape of symbol object 200, as the developer employed in FIG. 2B, the developer has now selected to reduce the size or shrink symbol object 200. Again, as can be seen, the corner regions, including graphic articles 205, 207, 209, and 211, have been preserved or maintained in size and shape, because these regions have been locked by the 9-scale feature. In contrast, the top and bottom regions, including graphic articles 206 and 210, and the side regions, including graphic articles 206 and 210, have been scaled or reduced in size and shape.

In contrast to the increased size from FIG. 2B, when reducing the size of symbol object 200, GDE 20 deletes pixels within the editable regions (i.e., the top, bottom, and side regions), to fit the reduced size and shape. This deletion of pixels causes the distortion in the graphic articles contained within those editable regions. However, even though the editable regions negatively scale, which, depending on the graphic articles making up the editable regions, may appear distorted when edited, the corner regions are locked and uneditable, and, therefore, remain a constant size and shape. The movement that does occur in these locked regions merely translates the pixels of that region to maintain the contiguous shape and connection of symbol object 200.

It should be noted that grid lines 201-204 may only be displayed or superimposed onto symbol object 200 when the developer is specifically editing symbol object 200 within GDE 20. Once an instance of symbol object 200 is placed onto the design canvas, the instance becomes a part of the design page without the grid lines. However, as the developer manipulates the size or shape of the design page, the instance of symbol object 200 will scale or change according to the 9-scale parameters and the orientation of grid lines 201-204 as the developer laid out.

It should further be noted that in additional and/or alternative embodiments of the present invention, grid lines 201-204 may be visible at various different stages of the design or editing process. The current invention is not limited to any single way of displaying or providing for the 9-scale grid lines.

Figure 3A:
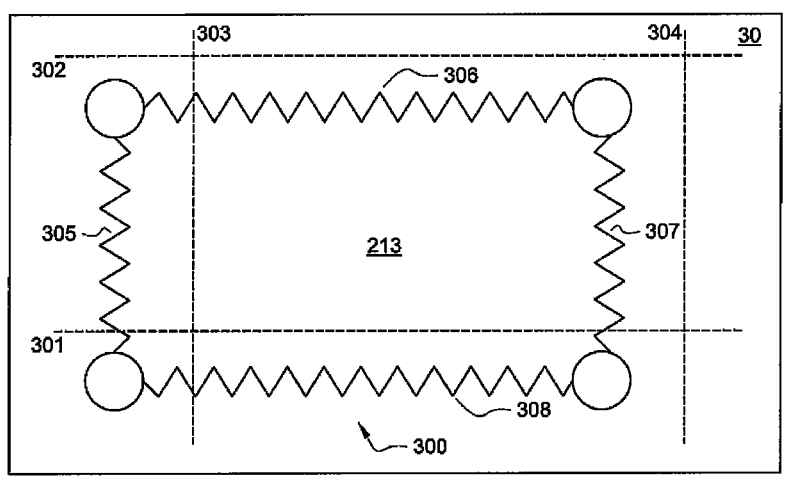
FIG. 3A is a screenshot illustrating a GDE configured according to one embodiment of the present invention.

FIG. 3A is a screenshot illustrating GDE 30 configured according to one embodiment of the present invention. In developing the raster graphic object, the designer has included a graphical pattern. The developer converts the raster graphic object into symbol object 300 within GDE 30. When the developer activates the 9-scale feature, grid lines 301-304 are superimposed onto symbol object 300 visually dividing it into four sections. As illustrated in FIG. 2, the visual division does not physically separate symbol object 300 into separate and independent objects, but simply creates associated regions within the same continuous object. The association between the visual regions and the underlying symbol allows each visual region to be separately and directly edited in symbol object 300.

In the illustrated embodiment, the developer drags grid lines 302 and 304 off of symbol object 300. This manipulation of grid lines 301-304 allows the developer to control how symbol object 300 scales. It should be noted that the developer can select to leave all or none of grid lines 301-304 on symbol object 300. The manner in which symbol object 300 scales will be based on which of the grid lines are superimposed onto symbol object 300, and what their orientation is to the object.

Figure 3B:
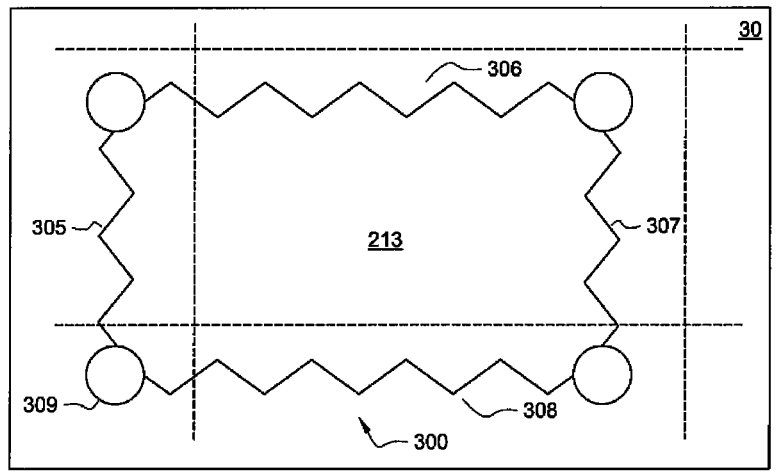
FIG. 3B is a screenshot illustrating a GDE configured according to one embodiment of the present invention.

FIG. 3B is a screenshot illustrating GDE 30 configured according to one embodiment of the present invention. When symbol object 300 is stretched, a number of distortions occur to the object. The corner section, containing graphic article 309 is locked and uneditable, and, thus, is preserved in size and shape. However, each of the other regions of symbol object 300 is scaled. Because symbol object 300 represents a raster graphic object, pixels are added or deleted to accommodate the new shape scaled symbol object 300. As can be seen in FIG. 3B, sections 305-308 of symbol object 300 originally included a saw-tooth pattern along the size and shape shown in FIG. 3A. However, after symbol object 300 has been modified, the saw-tooth pattern of regions 305-308 has been stretched and distorted from that original shape and size. This visible stretching may or may not be a desirable effect to the developer. If it is not, GDE 30 provides an option to the developer to address the distortion.

Figure 3C:
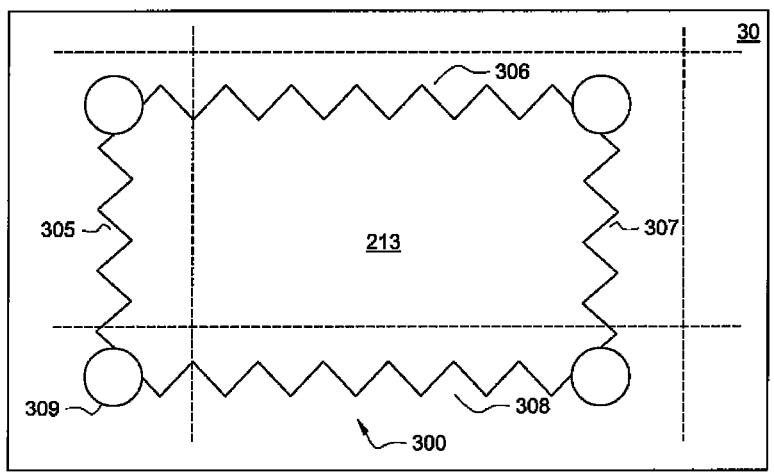
FIG. 3C is a screenshot illustrating a GDE configured according to one embodiment of the present invention.

FIG. 3C is a screenshot illustrating GDE 30 configured according to one embodiment of the present invention. When the developer does not wish to have a distorted effect shown on a pattern contained within one of the editable regions of symbol object 300, he or she may select an option in GDE 30 that designates selected editable regions as repeating regions. A repeating region is a section of a symbol object that includes a pattern that is repeated across any part of the length of the particular section or region. The developer selects sections 305-308 as repeatable regions. Once this designation attaches, when the instance of symbol object 300 is placed on the design canvas and modified, GDE 30 captures a series of pixels making up sections 305-308, analyzes the pixels for a pattern, and then uses that pattern to fill or subtract space to accommodate the edits and changes made by the developer.

As illustrated in FIG. 3C, when the user changes the shape of symbol object 300, when sections 305-308 have been designated as repeating regions, the pattern present within sections 305-308 is repeated. Here, the modified symbol object 300 has been transformed in size and shape, but the pattern represented by the underlying raster graphic object is maintained at a consistent size and shape.

Figure 4:
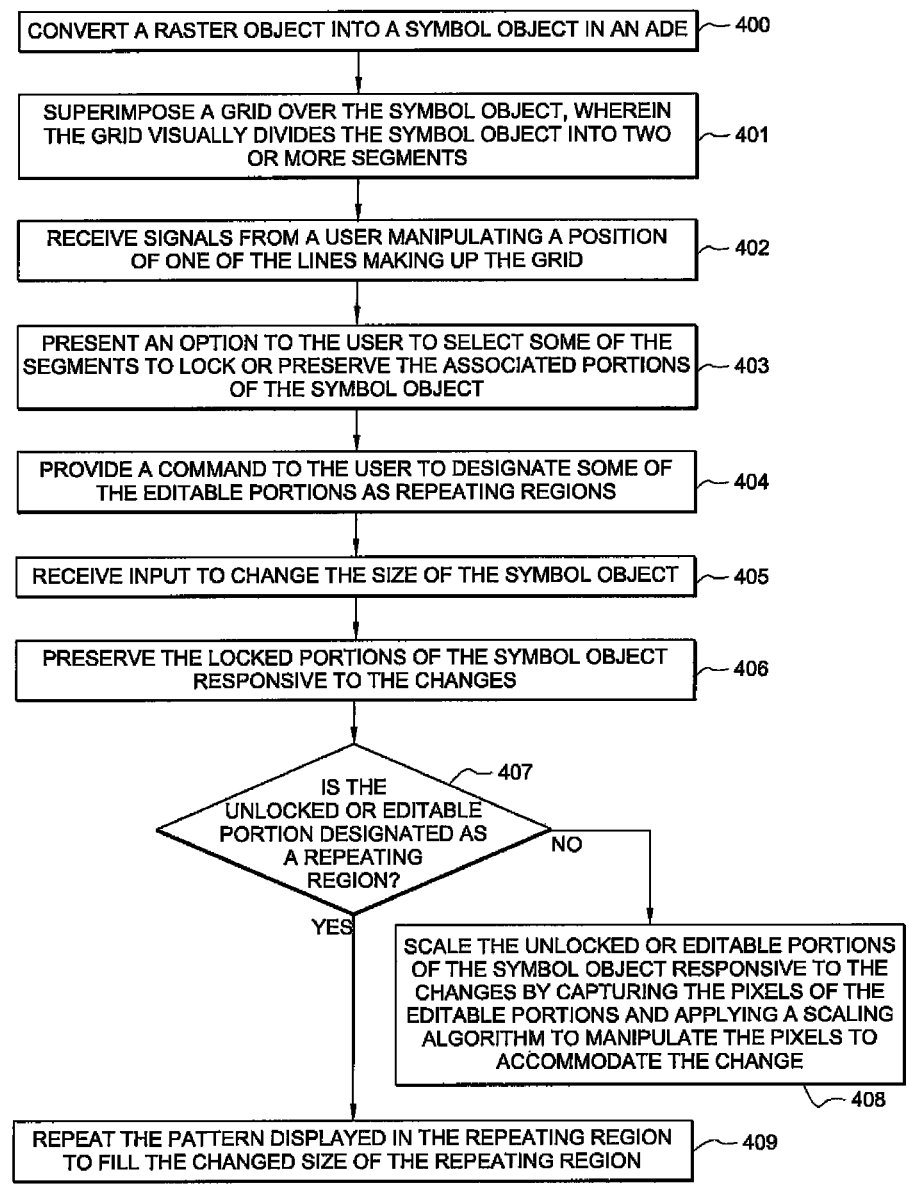
FIG. 4 is a flowchart illustrating example steps executed to implement one embodiment of the present invention.

FIG. 4 is a flowchart illustrating example steps executed to implement one embodiment of the present invention. In step 400, a raster object is converted into a symbol object in a GDE. A grid is superimposed, in step 401, over the symbol object, wherein the grid visually divides the symbol object into two or more segments. Signals are received, in step 402, from a user manipulating a position of one or more of the lines making up the grid. An option is presented, in step 403, and available to the user to select some of the segments to lock or preserve the associated portions of the symbol object. In step 404, a command is presented and available to the user to designate some of the editable portions as repeating regions. Input is received, in step 405, to change the size of the symbol object. The locked portions of the symbol object are preserved, in step 406, responsive to the changes. A determination is made in step 407, whether the unlocked or editable portion has been designated as a repeating region. If not, the unlocked or editable portions of the symbol object is scaled, in step 408, responsive to the changes by capturing the pixels of the editable portions and applying a scaling algorithm to manipulate the pixels to accommodate the change. Otherwise, if a repeating region has been designated, the pattern displayed in the repeating region is repeated, in step 409, to fill the changed size of the repeating region.

It should be noted that in additional and/or alternative embodiments of the present invention, a GDE may present an option available to the developer to individually select which region or section of the divided symbol object is to be preserved, and which regions are editable. In this additional feature, the developer remains in complete control over how the resulting symbol instance will be scaled or transformed on the design page. This additional control allows the developer to deviate from the standard 9-scale processing.

Figure 5:
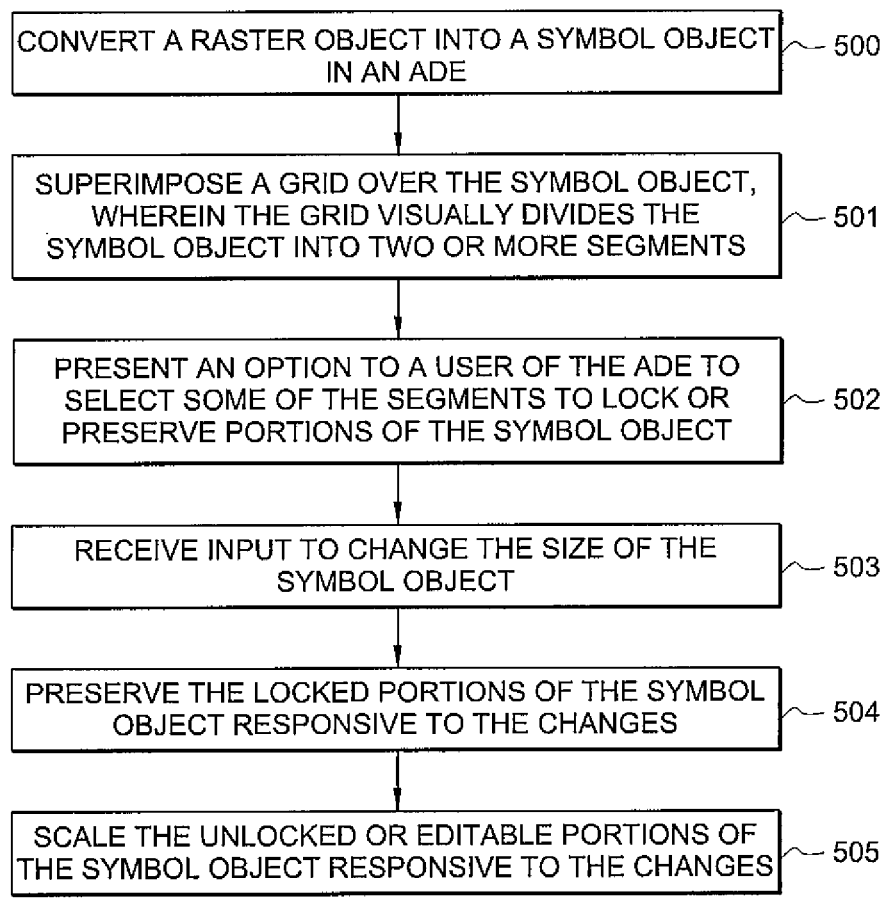
FIG. 5 is a flowchart illustrating example steps executed to implement one embodiment of the present invention.

FIG. 5 is a flowchart illustrating example steps executed to implement one embodiment of the present invention. In step 500, a raster object is converted into a symbol object in a GDE. A grid is superimposed over the symbol object, in step 501, wherein the grid visually divides the symbol object into two or more segments. In step 502, an option is presented and available to a user of the GDE to select some of the segments to lock or preserve portions of the symbol object. Input to change the size of the symbol object is received in step 503. The locked portions of the symbol object are preserved, in step 504, responsive to the changes. While the unlocked or editable portions of the symbol object are scaled, in step 505, responsive to the changes.

The program or code segments making up the various embodiments of the present invention may be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, and the like. The computer data signal may include any signal that can propagate over a transmission medium such as electronic network channels, optical fibers, air, electromagnetic, RF links, and the like. The code segments may be downloaded via computer networks such as the Internet, Intranet, and the like.

Figure 6:
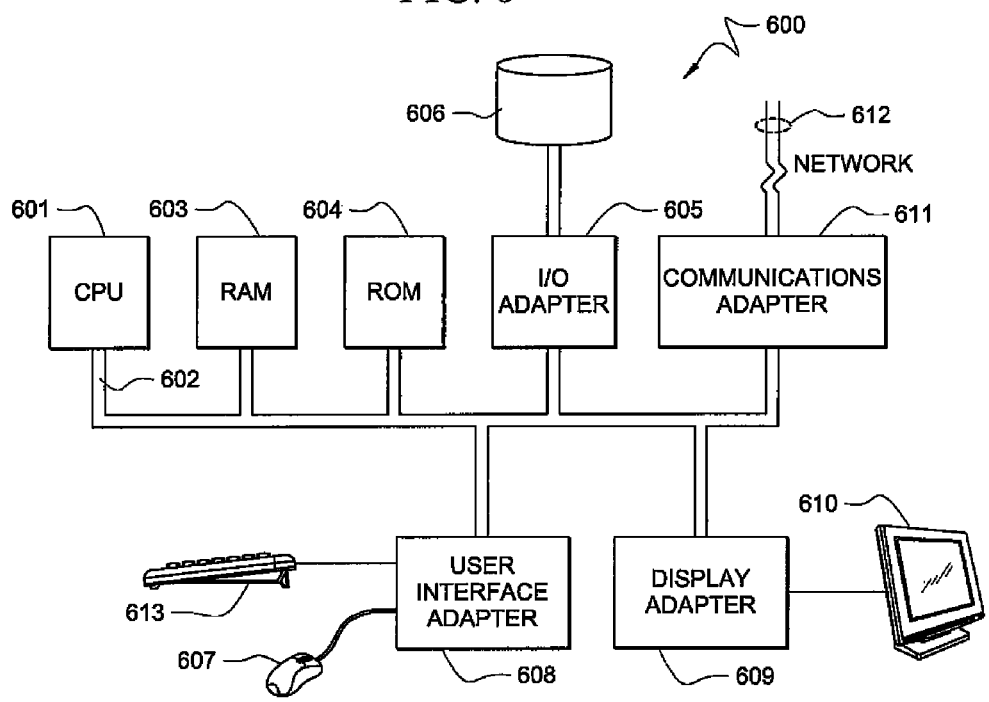
FIG. 6 illustrates a computer system adapted to use embodiments of the present invention.

FIG. 6 illustrates computer system 600 adapted to use embodiments of the present invention, e.g. storing and/or executing software associated with the embodiments. Central processing unit (CPU) 601 is coupled to system bus 602. The CPU 601 may be any general purpose CPU. However, embodiments of the present invention are not restricted by the architecture of CPU 601 as long as CPU 601 supports the inventive operations as described herein. Bus 602 is coupled to random access memory (RAM) 603, which may be SRAM, DRAM, or SDRAM. ROM 604 is also coupled to bus 602, which may be PROM, EPROM, or EEPROM. RAM 603 and ROM 604 hold user and system data and programs as is well known in the art.

Bus 602 is also coupled to input/output (I/O) controller card 605, communications adapter card 611, user interface card 608, and display card 609. The I/O adapter card 605 connects storage devices 606, such as one or more of a hard drive, a CD drive, a floppy disk drive, a tape drive, to computer system 600. The I/O adapter 605 is also connected to a printer (not shown), which would allow the system to print paper copies of information such as documents, photographs, articles, and the like. Note that the printer may be a printer (e.g., dot matrix, laser, and the like), a fax machine, scanner, or a copier machine. Communications card 611 is adapted to couple the computer system 600 to a network 612, which may be one or more of a telephone network, a local (LAN) and/or a wide-area (WAN) network, an Ethernet network, and/or the Internet network. User interface card 608 couples user input devices, such as keyboard 613, pointing device 607, and the like, to the computer system 600. The display card 609 is driven by CPU 601 to control the display on display device 610.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer implemented method comprising:
converting a raster object into a symbol object in a graphics development environment (GDE) provided by a computing apparatus;
providing visual output from the computing apparatus depicting the symbol object and superimposing a grid over said symbol object in said visual output, wherein said grid visually divides said symbol object into two or more segments;
receiving first input via an input device interfaced to the computing apparatus, the first input designating segments corresponding to editable portions of the symbol object as repeating regions;
receiving second input via the input device to change a size of said symbol object;
responsive to said first and second input:
preserving locked portions of said symbol object represented by ones of said two or more segments; and
scaling editable portions of said symbol object designated as repeatable regions, wherein scaling comprises analyzing pixels of the editable portion designated as a repeatable region for an instance of a pattern and repeating the instance of the pattern to fill the region as changed in response to said second input with a plurality of instances of the pattern,
wherein the pattern is defined by a plurality of pixels and has an original size and original shape, and
wherein each of the plurality of instances of the pattern features a copy of the plurality of pixels defining the pattern and each instance has the original size and original shape.

2. The method of claim 1 further comprising:
receiving one or more signals from a user of said GDE, wherein said one or more signals manipulate a position of one or more lines making up said grid.

3. The method of claim 1 wherein said preserving comprises:
capturing a plurality of pixels of said symbol object represented by said locked portions; and
maintaining said plurality of pixel in size and shape.

4. The method of claim 1 further comprising:
associating each of said two or more segments with a corresponding area on said symbol object.

5. The method of claim 1 wherein said input to change said size represents change of said size of a portion of said symbol object.

6. The method of claim 1 further comprising:
receiving input selecting said ones of said two or more segments comprising said locked portions via said input device.

7. A computer implemented method comprising:
converting a bitmapped graphic into a symbol object in a graphics development environment (GDE) provided by a computing apparatus;
overlaying one or more lines onto said symbol object displayed on a computer display interfaced to the computing apparatus, wherein said one or more lines visually divides said symbol object into two or more sections;
receiving locking input via an input device interfaced to the computing apparatus, the locking input designating one or more of said two or more sections as locked regions;
displaying an option on said computer display for selecting at least one editable region as a repeating region;
receiving edit input via said input device affecting a visual dimension of said symbol object; and
scaling an editable region of said symbol object, wherein said editable region comprises ones of said two or more sections not designated as one or more locked regions, wherein scaling comprises analyzing pixels of said at least one repeating region for a pattern of pixels having an original size and shape and repeating said pattern of pixels to accommodate said edit input, the pattern of pixels repeated so that multiple copies of the pattern of pixels are included in the symbol object in response to scaling, each of the multiple copies of the pattern of pixels having the original size and shape.

8. The method of claim 7 further comprising:
moving said one or more lines responsive to a user dragging said one or more lines to a desired location.

9. The method of claim 7 further comprising:
associating each of said two or more sections with a corresponding area on said symbol object.

10. A computer program product having a non-transitory computer readable medium with computer program logic recorded thereon, said computer program product embodying program code comprising:
code for converting a raster object into a symbol object in a graphics development environment (GDE);
code for providing visual output via a computer display, the visual output depicting said symbol object;
code for superimposing a grid over said symbol in said visual output, wherein said grid visually divides said symbol object into two or more segments;
code for providing a command on said computer display to designate at least one segment as a repeating region;
code for analyzing pixels in a portion of said raster object for a pattern, the portion corresponding to the segment designated as repeating;
code for receiving input to change a size of said symbol object to result in the repeating region having a changed size;
code for scaling at least the portion of said symbol object designated as repeating in response to the input to change the size of the symbol object, wherein scaling comprises repeating the pattern to fill said changed size with multiple copies of the pattern.

11. The computer program product of claim 10 further comprising:
code for receiving one or more signals from a user of said GDE, wherein said one or more signals manipulate a position of one or more lines making up said grid.

12. The computer program product of claim 10 wherein said code for preserving comprises:
code for capturing a plurality of pixels of said symbol object represented by said locked portions; and
code for maintaining said plurality of pixel in size and shape.

13. The computer program product of claim 10 further comprising:
code for associating each of said two or more segments with a corresponding area on said symbol object.

14. The computer program product of claim 10 wherein said input to change said size represents change of said size of a portion of said symbol object.

15. The computer program product of claim 10 further comprising:
code for providing a command on said computer display presenting an option to a user of said GDE to select said ones of said two or more segments comprising said locked portions.

16. The computer program product of claim 10, further comprising:
code for stretching at least a portion of said symbol object not designated as repeating in response to the input to change the size of the symbol object,
wherein stretching is different from said scaling that comprises repeating the pattern to fill said changed size with multiple copies of the pattern.

17. A computer system comprising a processor coupled to a non-transitory storage medium embodying executable code which, when executed by the processor, configures the computer system to perform steps comprising:
converting a bitmapped graphic into a symbol object and providing output for displaying the symbol object via a display device;
overlaying one or more lines onto said symbol object, wherein said one or more lines visually divide said symbol object as displayed via said display device into two or more sections;
receiving locking input designating one or more of said two or more sections as one or more locked regions;
receiving input designating at least one of said two or more sections as a repeating region, the at least one section designated as a repeating region being different from the one or more sections designated as locked;
receiving edit input from said user affecting a visual dimension of said symbol object on said display device; and
scaling an editable region of said symbol object, wherein said editable region comprises one of said two or more sections not designated by said user as said one or more locked regions,
wherein scaling comprises analyzing pixels of said at least one section designated as a repeating region to determine a pattern, the pattern having an original size and original shape and defined by multiple pixels, and repeating said pattern to accommodate said edit input, wherein when the pattern is repeated by copying the multiple pixels defining the pattern so that a plurality of copies of the pattern are included in the symbol object in response to scaling, each of the copies maintaining the original size and shape.

18. The system set forth in claim 17 wherein said executable code configures the computer system to perform steps further comprising:

moving said one or more lines responsive to input dragging said one or more lines to a desired location on said display device using said user input device.

\* \* \* \* \*